United States Patent
Gupta et al.

(10) Patent No.: US 7,484,055 B1
(45) Date of Patent: Jan. 27, 2009

(54) FAST HANDLING OF STATE CHANGE NOTIFICATIONS IN STORAGE AREA NETWORKS

(75) Inventors: Sumit Gupta, Newark, CA (US); Deepak M. Babarjung, Newark, CA (US); Sajid Zia, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 790 days.

(21) Appl. No.: 11/151,631

(22) Filed: Jun. 13, 2005

(51) Int. Cl.
*G06F 13/00* (2006.01)
*G06F 12/00* (2006.01)

(52) U.S. Cl. .................. 711/156; 711/100; 711/154; 709/223

(58) Field of Classification Search ............... 711/100, 711/141, 146, 154, 156; 709/223
See application file for complete search history.

(56) References Cited

U.S. PATENT DOCUMENTS

| | | | | |
|---|---|---|---|---|
| 4,783,730 A | * | 11/1988 | Fischer | 710/5 |
| 5,423,006 A | | 6/1995 | Brown et al. | |
| 5,655,076 A | * | 8/1997 | Kimura et al. | 714/56 |
| 5,915,122 A | * | 6/1999 | Tsurumi | 713/330 |
| 6,094,725 A | * | 7/2000 | Hiyoshi et al. | 713/340 |
| 6,523,138 B1 | * | 2/2003 | Natsume et al. | 714/43 |
| 2004/0015241 A1 | | 1/2004 | Brown et al. | |
| 2004/0015619 A1 | | 1/2004 | Brown et al. | |
| 2004/0015620 A1 | | 1/2004 | Brown et al. | |
| 2004/0034638 A1 | | 2/2004 | Brown et al. | |

* cited by examiner

*Primary Examiner*—Tuan V. Thai
(74) *Attorney, Agent, or Firm*—Kent A. Lembke; Marsh Fischmann & Breyfogle LLP

(57) ABSTRACT

A method for faster handling of state change notifications in a storage network such as storage area network (SAN). The method includes receiving a state change notification at a host. The notification is processed to identify a target device affected by a state change. The method includes cleaning an input/output (I/O) resource of the host of I/O operations associated with the target device. A new session request is transmitted from the host to the target device, such as the next communication from the host after receipt of the notification. The cleaning of the host's I/O resources may include killing or abandoning pending I/O operations related to the target device and may also include halting or stopping additional or future I/O operations to the target device. The method includes operating the affected target device to acknowledge the new session request and initiate a new session that includes refreshing target I/O resources.

20 Claims, 3 Drawing Sheets

FAST HANDLING OF STATE CHANGE NOTIFICATIONS IN STORAGE AREA NETWORKS

BACKGROUND OF THE INVENTION

1. Field of the Invention

The present invention relates, in general, to processes of discovering and managing states of devices in a computer network such as a storage area network (SAN), and, more particularly, to a method, and systems configured to support using such a method, for quickly handling notifications of changes in state of networked devices to improve input/output (I/O) performance of network, such as a SAN.

2. Relevant Background

Storage area networks (SANs) are being deployed in large numbers today to meet demands for data processing and storage. Generally, a SAN is a network of interconnected computers and storage devices, and each SAN includes an interconnection infrastructure that links the computers and storage devices to facilitate communications or input/output operations (or I/Os). The I/O interconnect infrastructure may be built on any of a number of interface or communication technologies including Fibre Channel and employ the Fibre Channel Protocol to control communications and Small Computer System Interface (SCSI) or Internet-based versions of these technologies such as iFCP or iSCSI or a hybrid version of any of these technologies.

The number of devices included in a typical SAN has rapidly grown, and these large numbers of devices have made it generally impossible or at least impractical for a host or other device on a SAN to discover all of the devices on the SAN by polling or other techniques. In response, large scale SANs utilize a name server (e.g., a Storage Name Server (SNS) in Fibre Channel SANs, an Internet Storage Name Server (iSNS) in IP storage networks, or the like) that acts as a central repository of information about what devices are connected in the network. As new devices are added to a network, the devices register themselves with the name server that maintains a persistent table or database with an entry for each device that has announced that it is connected to the network. A "well-known address" is reserved in the network to enable the newly added devices to find the name server in the network. The SAN name server can be located anywhere in the network such as a software component of a server or a component of a Fibre Channel switch. Because every storage device must register with the name server, a host or initiator can simply query the name server to obtain a list of all devices (such as all devices that support FCP or iSCSI or the like). Each device registers a set of attributes such as an entity type (for example, an iFCP device), a unique device identifier or entity ID, and the device's IP address in the network.

In addition to initially discovering devices in a SAN, it is important for nodes, such as initiators and targets, to be aware of changes to the SAN including devices being added or removed from the SAN, resetting of a device, and devices or infrastructure configuration changes. To address this need, services or nodes can register with the name server to receive notifications when changes occur in the SAN. In a SAN, when a change happens, the name server notifies all the nodes that have registered for notification about the change by issuing a state change notification (SCN), and the name server updates its database of active devices. In this manner, the name server is able to proactively report any changes throughout the SAN to interested devices.

The use of state change notifications (SCNs) is effective for updating initiators and other nodes of the status of devices in a SAN, but the processing of SCNs can significantly decrease the efficiency of I/O processing in a SAN. As a result, a number of technologies and techniques have been developed to handle SCNs in SANs. Most of these techniques attempt to clean from the SAN (the host, the initiator, switches, targets, and any other effected devices) all the pending communications or I/Os that are related to the change defined in a SCN before the SAN proceeds with other activities. However, such I/O cleaning can be a time-consuming process and can take up to several seconds to complete, which often produces a noticeable and unacceptable slowing of data flow in the SAN. The problem of reduced SAN efficiency is sometimes exasperated rather than improved when I/O cleaning techniques are employed because a bad device in a SAN fabric can cause a continuing storm of notifications or SCNs, which can result in all or substantially all I/Os being halted in the SAN or portions of the SAN because of one bad device. This problem has led some SAN vendors to configure their SAN switches to try to detect SCN storms caused by one bad device in an attempt to reduce the hampering of SAN communications that can be caused by SCN processing. The storage industry, however, continues to demand a more effective method of handling state change notifications (SCNs) so as to maintain the communication effectiveness of the SAN while allowing nodes to be aware of the status of the network and its devices.

Hence, there remains a need for an improved method for handling state change notifications in storage network, e.g., SANs. Preferably, such a method would be faster than existing methods of cleaning I/O operations from a SAN after a change occurs while continuing to support name servers, e.g., SNS and iSNS, as presently configured including ongoing transmittal of SCNs to provide notice of network changes.

SUMMARY OF THE INVENTION

The present invention addresses the above and other problems by providing a method and corresponding systems for faster handling of state change notifications from name servers in a storage network such as a storage area network (SAN). Generally, the method involves performing a local cleaning of input/output resources of a host or initiator device in the network and transmitting a new session request to one or more devices (e.g., target devices such as data storage devices) rather than requests for clean up of remote I/O resources. The local clean up is competed very quickly, e.g., milliseconds, and starting a new session results in refreshing or cleaning of remote or affected target I/O resources.

More particularly, a method is provided for handling state change notifications (SCNs) with hosts or initiators in a data storage network such as a SAN. The method includes receiving an SCN (or event notification) at a host. The SCN is processed to identify all target devices in the data storage network that are affected by a change in state in the data storage network. The method continues with cleaning an input/output (I/O) resource of the host of I/O operations associated with the affected target devices. The method also includes transmitting a new session request from the host to the affected target devices, such as part of the next communication from the host after receipt of the SCN. The cleaning of the host's I/O resources may include killing or abandoning pending I/O operations related to the affected target devices and may also include halting or stopping additional or future I/O operations to the affected target devices.

In some embodiments, the method further includes operating the affected target devices to receive the new session request, to acknowledge the received new session request, and to initiate a new session that includes refreshing (or cleaning) an I/O resource at the affected target devices. The method may then continue with receiving the new session acknowledgment from the target devices at the host and in response, resuming I/O operations with the target devices. As an initial step, the method may further include registering the host with a name server (such as a Fibre Channel storage name server (SNS) or an Internet SNS (iSNS)) to receive state change notifications based on change of state events for the data storage network.

DETAILED DESCRIPTION OF THE PREFERRED EMBODIMENTS

In brief, the present invention is directed to a method of more effectively and quickly processing state change notifications issued by a naming service or name server (such as a storage name server (SNS) or Internet storage name server (iSNS)). Briefly, the method, and system configured for performing such a method, are described below as involving a host device running a change notice handler (e.g., a software application provided as part of the host software) that processes each change notice to determine which network devices are affected by a change. The change notice handler acts to clean up the input/output (I/O) resources on the host (i.e., local I/O resources) but does not issue a request for clean up of the I/O resources (i.e., remote I/O resources) on the affected devices. Instead, the change notification handler halts all I/O activity to the affected devices until it transmits a new session request to the affected devices, which causes the devices to start fresh with cleaned up I/O resources.

The change notice handling method is suited for any storage network in which state change notices (SCNs) are issued such as most storage area networks (SANs) regardless of the storage network transport mechanisms (such as transport mechanisms provided according to SCSI or iSCSI protocols, Fibre Channel protocols (FCP), iFCP, or other mechanisms or technologies) utilized by the SAN. With that in mind, in the following discussion, computer and network devices, such as the software and hardware devices within the storage network 100, are described in relation to their function rather than as being limited to particular electronic devices and computer architectures and programming languages.

To practice the invention, the computer and network devices may be any devices useful for providing the described functions, including well-known data processing and communication devices and systems, such as application, database, web, blade, and entry level servers, midframe, midrange, and high-end servers, personal computers and computing devices including mobile computing and electronic devices with processing, memory, and input/output components and running code or programs in any useful programming language, and server devices configured to maintain and then transmit digital data over a wired or wireless communications network. In addition to these devices, the SAN "devices" may be switches, gateways, and any storage device suitable for a storage network such as RAID devices, JBOD devices, and the like that are configured to a SAN transport technology, such as, but not limited to, Fibre Channel or iSCSI. Data, including transmissions to and from the elements of the storage network 100 and among other components of the network/systems 100, 300 typically is communicated in digital format following standard communication and transfer protocols, such as TCP/IP, HTTP, HTTPS, FTP, and the like, or IP or non-IP wireless communication protocols.

Figure 1:
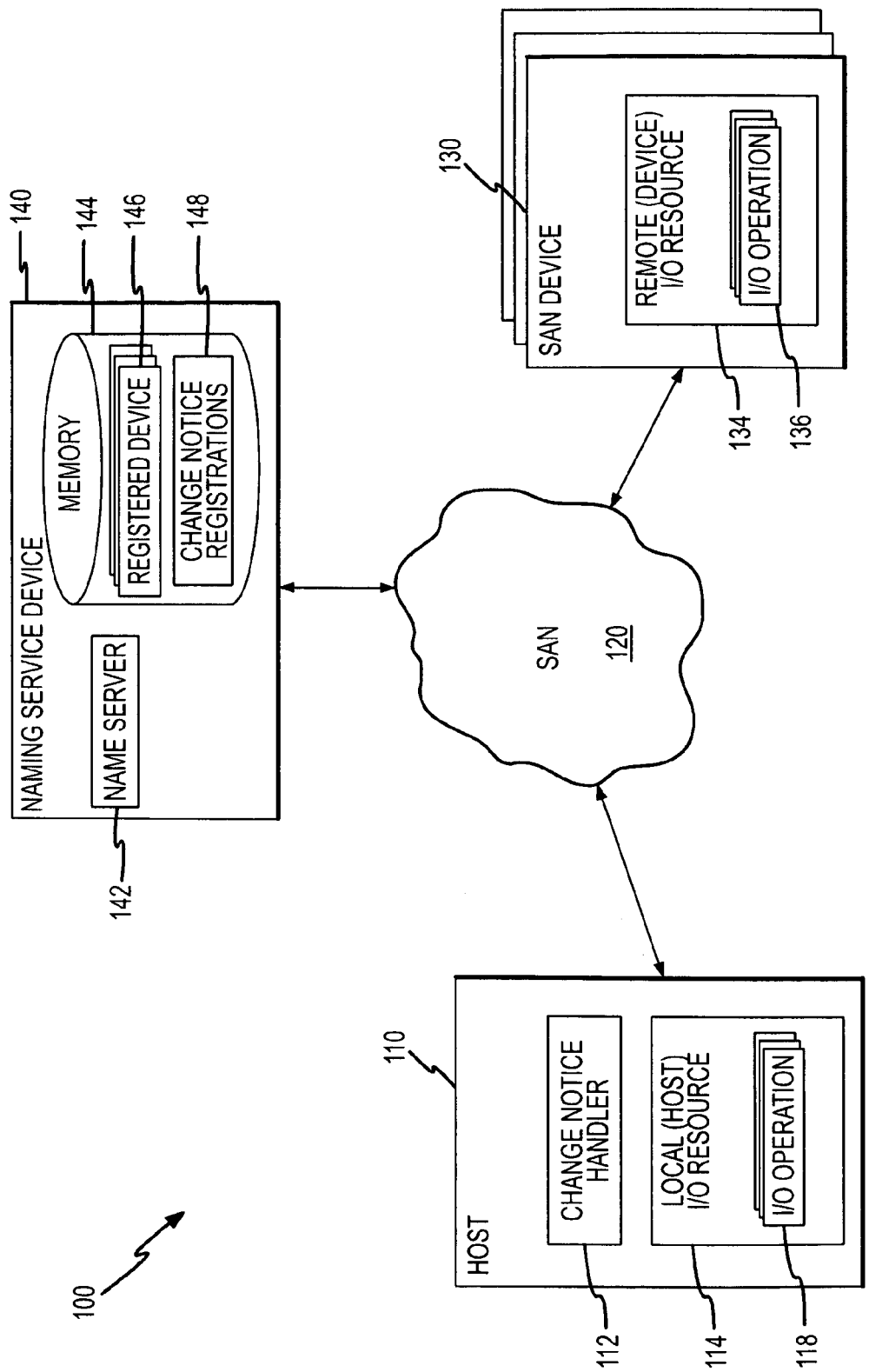
FIG. 1 illustrates a simplified storage network adapted for implementing the change notice handling method of the present invention.

The invention is well-suited for use with host devices, management platforms, switch and other SAN communication devices, disk devices in a storage network, such as a SAN, but other network arrangements may be used to practice the invention, and the communication fabric/network or SAN 120 of FIG. 1 is typically an iSCSI or SCSI SAN or Fibre Channel or iFCP SAN but other existing and yet-to-be developed communication and transport protocols may be used to practice the invention, with the particular underlying SAN technology not being as important as the functioning of the host with the change notice handler to provide fast handling of SCNs or similar event notifications.

FIG. 1 illustrates a storage network 100 configured according to the present invention. The network 100 is simplified for ease of explanation but it should be understood that the invention is useful in much more complicate storage networks that include many storage devices connected by a communication fiber or network and utilizing communication devices such as switches and including one or more management platforms and/or hosts.

As shown, the storage network 100 includes a host 110 linked to a SAN or communication fabric/network 120. The host 110 generally manages input and output (I/O) operations, such as reads and writes to and other communications with storage devices linked to the SAN 120, in the storage network. The host 110 includes local (or host) I/O resources 114 (such as a buffer or cache in memory) to store at least temporarily I/O operations 118, which may each include one or more packets of data. Each of the I/O operations 118 is associated with one or more SAN devices 130 linked to the SAN 120. The host 110 further includes a change notice handler 112 that, as discussed with reference to FIGS. 2 and 3 below, functions to provide fast event notification handling in the storage network 100.

The network 100 includes a number of SAN devices 130 that are provided on the SAN 120 for use by the host 110. For example, the SAN devices 130 may include data storage devices, e.g., servers such as iSCSI and Fibre Channel servers and disk devices such as RAID devices, JBOD devices, iSCSI storage, or the like, and communication interconnection and control devices, e.g., switches, gateway devices, and the like. The particular devices provided as SAN devices is not limiting to the invention as long as each SAN device 130 operates to register itself with name server 142 to make it readily discoverable by host 110 and its changes in state are communicated to or detectable by name server 142. The SAN devices 130 each include remote or device I/O resources, such as a buffer or cache in device memory, 134 for processing I/O operations 136, such as incoming read or write requests from host 110 or other SAN devices 130.

A naming service device 140 is also linked to the SAN 120 to run a name server or naming service 142 for the storage network 100 and the device 140 is provided at a well-known address to allow the devices 130 and host 110 to find it and register. In some embodiments, the name server is a Fibre Channel storage name server (SNS) or in IP-based SANs 120, an iSNS may be provided for name server 142. The name server 142 may reside in a plurality of devices 140 linked to the SAN 120 and operates to support discovery of SAN devices 130 by host 110 and by other initiator devices of storage network 100 (not shown).

To this end, naming service device 140 includes memory 144 which the name server uses to store registration information 146 for registered devices 130 and to store registrations for devices that have requested event notifications, e.g., SCNs. The registration information 146 can be thought of as an information database for SAN entities that can be queried by the host 110 such as via SNMP, iSNSP, or the like. For example, the host 110 or other "initiators" could query the name server 142 for the existence of devices 130, e.g., for storage "targets" linked to SAN 120. The registration information 146 for each device 130 may include a number of device attributes such as entity type (e.g., iFCP, iSCSI, or the like), a unique device identifier or ID, and the device's IP address.

During operation, the host or initiator 110 registers with the name server 142 for notifications of changes to the state of the storage network 100, and more particularly, for changes in the state of target devices 130. The name server 142 acts to store the change notice registration 148 in its memory 144. When a change in state event is detected by the name server 142, it acts to notify the host 110 (and any other interested initiators) by transmitting a change notice or state change notification (SCN) to the host 110. The name server 142 maintains an updated database 146 of active devices 130 and also proactively reports any changes in the state of devices 130 throughout the SAN 120 (or storage network 100).

When a SCN is received by the host 110, the host 110 must determine what actions are required to continue proper I/O operations in the storage network 100, and as is discussed below, the change notice handler 112 functions to process received SCNs and to clean up local and remote I/O resources 114, 134 with reduced effects on I/O operations and data transfer in the storage network 100 when compared with prior methods that attempted to request I/O clean up remote I/O operations at the devices 130.

Figure 2:
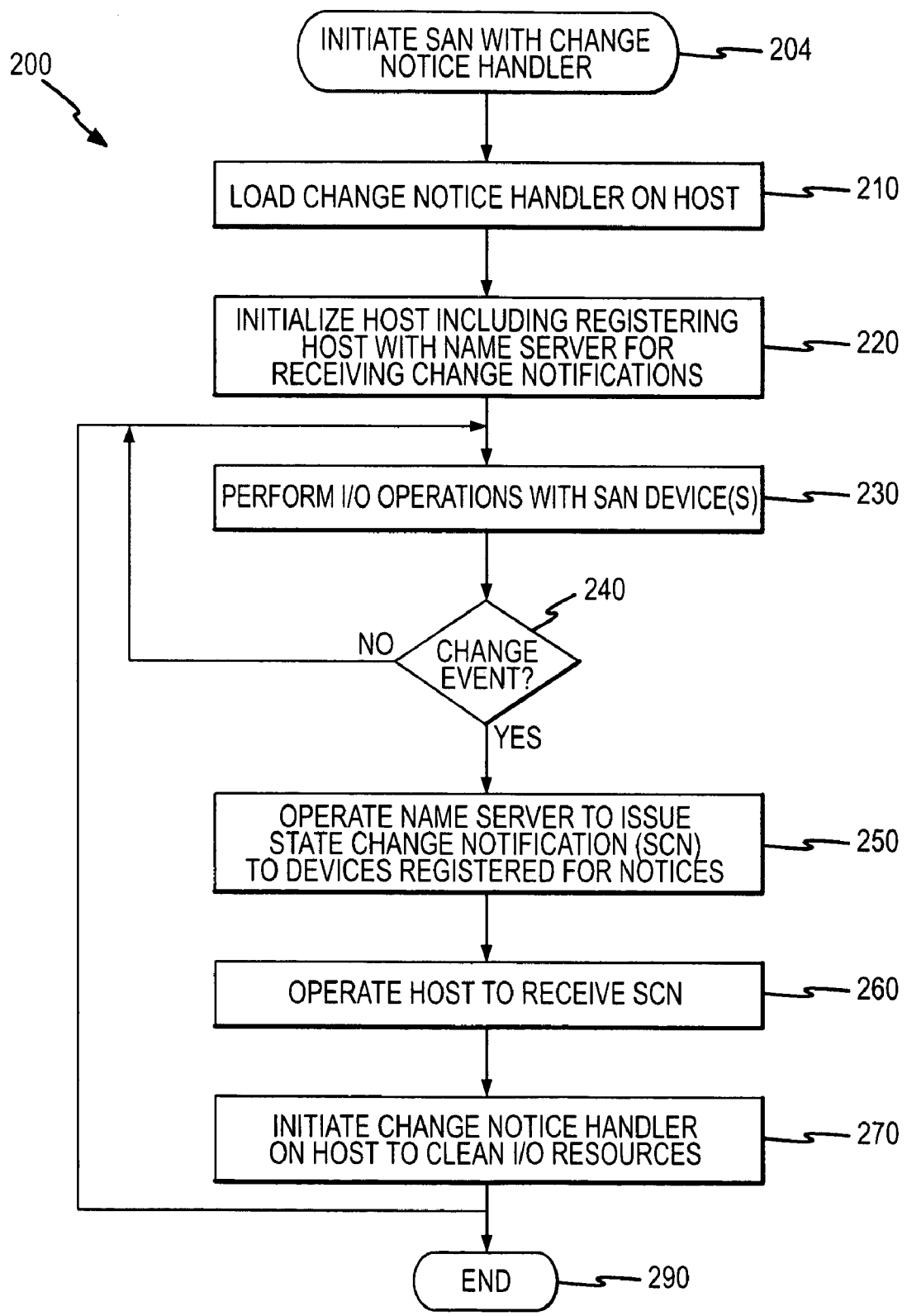
FIG. 2 illustrates exemplary steps performed in a storage network, such as the network of FIG. 1, to initialize such a network for I/O operations with a change handler.

FIG. 2 illustrates a portion of the operation of storage network 100 that includes a method of initiating the network 100 to perform the fast change notification handling according to the present invention. At 204, the method 200 begins typically with determining which initiators, such as host 110, in a storage network are to be configured with a change notice handler 112 for fast handling of state change notifications (SCNs). At 210, change notice handler 112 is loaded on each selected initiator or host 112. The handler 112 may be a separate program or subroutine or be provided as part of the software running on the host or initiator 110. At 220, the method continues with initializing the host (or other selected initiators) 110, with the initialization including registering the host 110 with the name server 142. The registration at 220 includes registering for receipt of event notifications or SCNs for one or more target or SAN devices 130.

At 230, the host 110 in conjunction with one or more target devices 130 operates to perform normal I/O operations, e.g., standard or conventional I/O operations for a SAN or other storage network. At 240, the method 200 continues with a determination of whether a change event has occurred, and if not, normal I/O operations continue at 230. Step 240 may be performed by the name server 142 of storage network 100 or may be considered an optional step with I/O operations continuing at 230 until an event occurs.

When a state-change event occurs, the name server 142 operates to issue an event notification or SCN to each initiator, such as host 110, in the storage network 100 that has registered for notifications as indicated with registrations 148. The notice or SCN from name server 142 may take a number of forms to practice the invention but generally, includes an ID for each device 130 affected by a change in state or otherwise defines the affected devices 130. In one embodiment, the SCN specifies the nodes 130 of the SAN 120 that are affected by the change of state but does not tell or indicate the nature of the change, with it being up to the recipient of the SCN to make this determination and determine how to handle the change to the device(s). For example, in a Fibre Channel implementation, the SCN from a name server 142 in the fabric 120 has a payload that contains information including the type of change and the affected devices 130 or IDs for the devices 130 on the SAN 120. In an iSCSI implementation, the name server (or iSNS server) 142 sends a SCNEvent or state change notice to the registered node 110, and the SCNEvent includes the following information a Source Attribute, a Message Key Attribute, and an Operating Attribute.

The change notice handler 112 is adapted to process such state change notification to determine the affected nodes or target devices 130 so as to determine which I/O operations in the local resources are to be aborted or cleaned up and to determine which nodes or devices 130 to transmit new session requests to, as is discussed with reference to FIG. 3. With this in mind, the method 200 continues at 260 with the host 110 receiving the state change notification from the name server 142 over the SAN 120. At 270, the change notice handler 112 is initiated or run on the host 110 to handle the notification in a prompt and relatively quick manner to clean I/O resources 114, 134 in the storage network 100 (i.e., both clean and remote) without transmitting a remote resource clean up request as was done in prior techniques or SANs. Step 270 is explained in detail with reference to the method 300 of FIG. 3. The method 200 continues at 230 with performing normal or standard I/O operations in the storage network 100 or optionally ends at 290.

Figure 3:
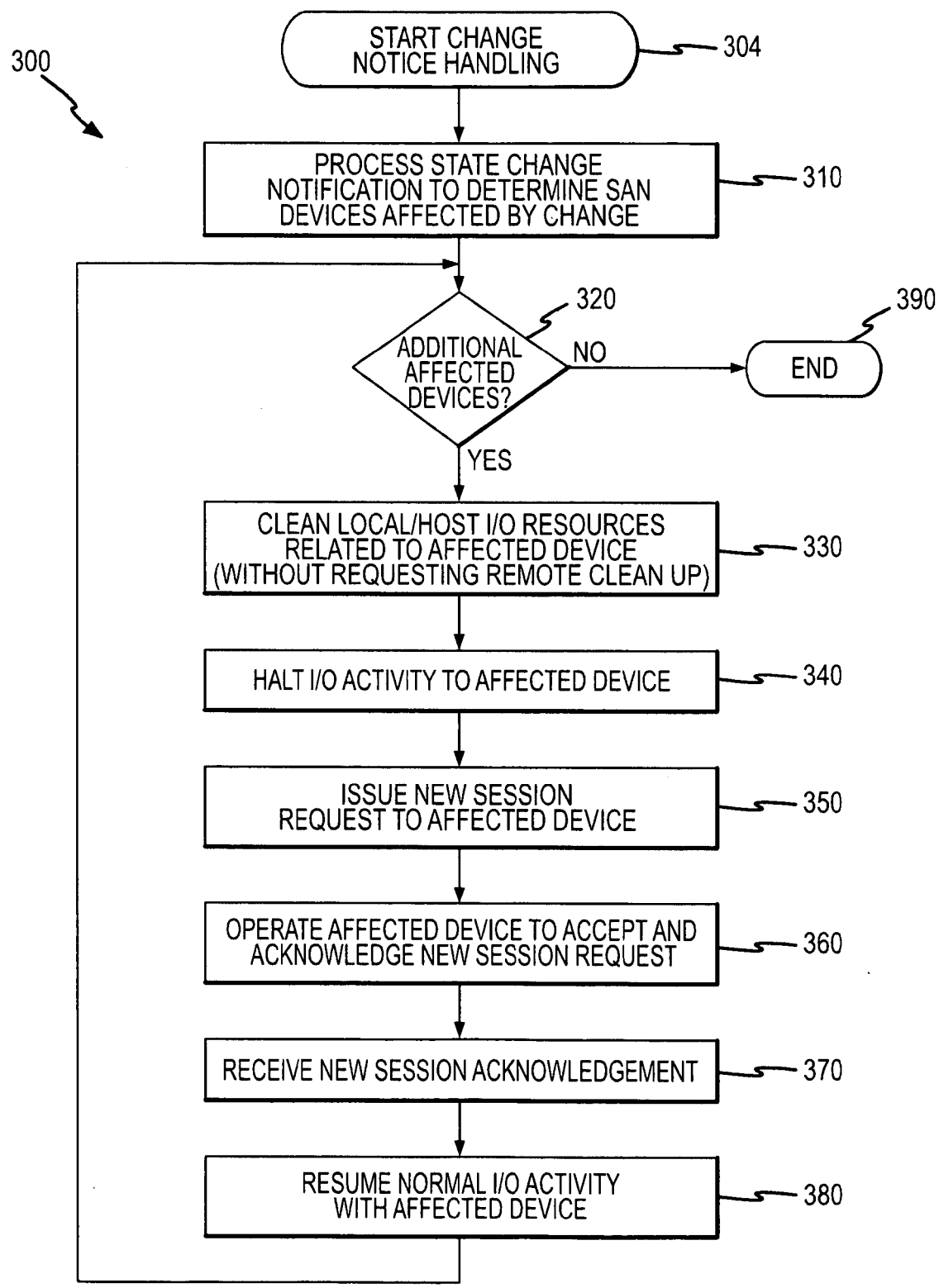
FIG. 3 is a flow diagram of a method of performing a fast change notice handling method according to the present invention, such as by operating the change notice handler shown in the network of FIG. 1.

FIG. 3 illustrates a method 300 of handling state change notifications, such as with operation of the change notice handler 112 of FIG. 1. The method 300 starts at 304 such as with the change notice handler 112 being called by the host 110 in response to receiving a state change notification from the name server 142. At 310, the handler 112 acts to process the notification to determine the target or SAN devices affected by the change of state as defined by the IDs provided in the notification. Because more than one device 130 may be affected by the state change, the handler 112 determines if there are more affected devices at 320 and if not, the method 300 ends at 390.

If more additional affected devices exist at 320, the method 300 continues at 330 with the handler 112 cleaning local I/O resources 114 of I/O operations 118 related to the next affected device. This is done without requesting remote clean up of the device or remote I/O resource 134 of the affected device so as to speed up the handling process 300. The handler 112 handles the notification in a fast and effective way including aborting all I/O operations 118 and stopping further I/O operations to the affected target device 130 as part of the clean up at 340. Since this operation is internal to the initiator or host 110 and its software, the clean up 330 is very fast.

A side effect of the clean up of the internal or local clean up at 330 and 340 is that the targets or affected devices 130 are not aware that the host or initiator 110 has already killed and/or cleaned up all I/O operations related to the affected devices 130. In order to later clean up the affected targets or affected devices 130, the method 300 continues at 350 with the change notice handler 112 or other host software making sure that the next operation to the affected target 130 is the start of a new session. A new session results in the cleaning up of I/O resource 134 at the target or affected device 130 (e.g., the affected device starts fresh). As shown in FIG. 3, the method 300 includes step 350 of operating the host or change notice handler 112 to issue a new session request to the affected target or SAN device 130.

At 360, the affected device 130 operates to accept the new session request and to transmit an acknowledgment over the SAN 120 to the host 110 or directly to the change notice handler 112 (shown at 370). At 380, the change notice handler 112 processes the acknowledgement from the device 130 and indicates to the host 110 that normal I/O operations with the affected device 130 can be resumed. Alternatively, the host 110 itself receives the acknowledgment and resumes normal I/O operations with the affected device 130 that has refreshed its I/O resource 134 by starting a new session. The method 300 continues at 320 with a determination if there are further affected devices 130. If so, the method 300 continues with the repeating of steps 330-380 and if not, the method 300 ends at 390 as the I/O resources 134 of all affected devices 130 identified in the state change notification have been cleaned up along with the I/O resource 114 of the host or initiator 110.

As will be understood from FIGS. 1-3 and the above description, the state change notification method of the present invention is faster than prior techniques and operates effectively based on a combination of factors. SCNs have a payload telling which IDs or devices 130 on a SAN 120 are affected by a state change. The method 300 results in an internal or local clean up of the I/O resources 114 on the host side, and such an internal clean up is much faster than trying to clean up commands by sending aborts to targets 130. But, this step has the side effect of initially leaving the target I/O resources 134 in a dirty state. To address this dirty state in remote or device I/O resources 134, a new session is initiated in each affected device 130 of the SAN 120, and a new session brings the target device 130 to a fresh start cleaning up all pending I/Os to the logging in initiator. The method 300 stabilizes operation of the host machine 110 in the storage network 100 and makes the host machine 110 nearly immune to problems with a single bad device 130 on the SAN 120. For example, SCNs can be handled in milliseconds with the method 300 rather than seconds or more as was seen in prior techniques, and the host 110 is in a more stable state even after a SCN storm.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method for handling state change notifications with hosts or initiators in a data storage network such as a storage area network (SAN), comprising:
   receiving a state change notification at a host;
   processing the received state change notification to identify a target device in the data storage network affected by a change in state in the data storage network;
   cleaning an input/output (I/O) resource of the host of I/O operations associated with the affected target device; and
   transmitting a new session request from the host to the affected target device.

2. The method of claim 1, wherein the cleaning of the host I/O resource comprises killing pending I/O operations related to the affected target device.

3. The method of claim 2, wherein the cleaning of the host I/O resource further comprises halting future I/O operations to the affected target device.

4. The method of claim 1, wherein transmitting of the new session request is transmitted from the host as part of a next communication from the host to the affected target device after receipt of the state change notification.

5. The method of claim 1, further comprising operating the affected target device to receive the new session request, to acknowledge the received new session request, and to initiate a new session to refresh an I/O resource of the affected target device.

6. The method of claim 5, further comprising at the host receiving the new session acknowledgement and resuming normal I/O operations with the affected target device.

7. The method of claim 1, further comprising registering the host with a name server to receive state change notifications based on change of state events for the data storage network.

8. The method of claim 7, wherein the name server is a Fibre Channel storage name server (SNS) or an Internet storage name server (iSNS) and the host, name server, and affected target device are communicatively linked by a storage area network (SAN) that is based on Fibre Channel or Internet-based technologies, respectively.

9. A storage network, comprising:
   a storage area network (SAN) configured for digital data communications;
   a naming service device running a name server operable to register devices linked to the SAN and to transmit state change notifications upon a change in state of one or more registered devices on the SAN;
   a plurality of target devices linked to the SAN and registered with the name server; and
   an initiator device linked to the SAN and registered with the name server for receiving the state change notifications, wherein the initiator device comprises a change notice handler processing a received one of the state change notifications to identify a set of the target devices affected by a state change, to initiate a cleaning of I/O resources at the initiator device of I/O operations related to the set of affected target devices, and to issue a new session request to at least one of the affected target devices.

10. The system of claim 9, wherein the change notice handler transmits a new session request to each of the target devices in the affected set as a first communication after receipt of the received one of the state change notifications.

11. The system of claim 9, wherein the initiator device receives an acknowledgment of the new session request from the at least one of the affected target devices and in response, resumes I/O operations with the at least one of the affected target devices.

12. The system of claim 9, wherein the cleaning of the I/O resources at the initiator device comprises removing I/O operations related to the set of target devices affected by the state change from the initiator I/O resources and stopping further I/O activity with the set of target devices affected by the state change.

13. The system of claim 9, wherein the at least one of the affected devices accepts the new session request from the initiator device and initiates a new session including refreshing I/O resources at the at least one of the affected devices.

14. The system of claim 9, wherein the initiator device operates as a host on the SAN and the at least one of the affected devices is a data storage device and further wherein the name server is a Fibre Channel storage name server (SNS) or an Internet-based storage name server (iSNS).

15. A storage area network change of state handling method comprising:
   registering a host with a name server in the storage area network including requesting receipt of state change notifications for the storage area network;
   with the host, receiving a state change notification from the name server, the state change notification comprising a payload defining a device in storage area network affected by a change of state; and
   operating the host to transmit a new session request to the device affected by the change of state to clean up I/O resources of the device.

16. The method of claim 15, further comprising after the receiving of the state change notification, removing I/O operations associated with the device affected by the change of state from an I/O resource of the host.

17. The method of claim 16, further comprising at the host stopping further I/O operations with the device affected by the change of state and resuming I/O operations with the device affected by the change of state upon receiving acknowledgement of the new session request.

18. The method of claim 15, further comprising operating the affected device to receive the new session request, to acknowledge the received new session request, and to initiate a new session to refresh an I/O resource of the affected target device.

19. The method of claim 15, wherein the operating of the host to transmit the new session request does not include transmitting a request for the affected device to clean up the I/O resources of the device.

20. The method of claim 15, wherein the storage area network utilizes at least one of data transport mechanism selected from the group consisting of FCP, iFCP, SCSI, and iSCSI.

* * * * *